(12) United States Patent
Bleck et al.

(10) Patent No.: US 6,382,840 B1
(45) Date of Patent: May 7, 2002

(54) CONNECTOR FOR DETACHABLE CONNECTION OF AN OPTICAL WAVEGUIDE TO ANOTHER OPTICAL WAVEGUIDE

(75) Inventors: Oliver Bleck, München; Helge Schmidt, Speyer, both of (DE)

(73) Assignee: Tyco Electronics Logistics AG, Steinach (CH)

( * ) Notice: Subject to any disclaimer, the term of this patent is extended or adjusted under 35 U.S.C. 154(b) by 0 days.

(21) Appl. No.: 09/472,224

(22) Filed: Dec. 27, 1999

Related U.S. Application Data

(63) Continuation of application No. PCT/DE98/01478, filed on May 29, 1998.

(30) Foreign Application Priority Data

Jun. 24, 1997 (DE) .......................................... 197 26 855

(51) Int. Cl.[7] ................................................. G02B 6/38
(52) U.S. Cl. ............................. 385/60; 385/72; 385/78
(58) Field of Search ............................... 385/60, 72, 85, 385/78, 49, 77

(56) References Cited

U.S. PATENT DOCUMENTS

| 5,155,784 A | 10/1992 | Knott ........................... 385/88 |
| 6,108,482 A | * 8/2000 | Roth ........................... 385/139 |

FOREIGN PATENT DOCUMENTS

| DE | 28 03 670 C2 | 8/1978 |
| DE | 82 21 983 | 6/1983 |
| DE | 37 04 070 C2 | 8/1988 |
| EP | 0 034 987 A1 | 9/1981 |
| EP | 0 602 726 A1 | 6/1994 |

OTHER PUBLICATIONS

International Publication WO 86/02740 (Parzygnat), May 9, 1986.

* cited by examiner

Primary Examiner—Phan T. H. Palmer
(74) Attorney, Agent, or Firm—Herbert L. Lerner; Laurence A. Greenberg; Werner H. Stemer

(57) ABSTRACT

A connector for detachable connection of one end region of an optical waveguide to another optical waveguide in a plug-in direction includes a ferrule and a housing. The housing has a holding region for holding and guiding the ferrule such that the ferrule is angularly moveable and guided with respect to the plug-in direction. The housing includes a stress-relief region for firmly connecting the optical waveguide to the housing. In the region between the stress-relief region and the holding region, the connector includes at least one curvature-limiting region for limiting the outward bending of the optical waveguide given an angular displacement of the ferrule with respect to the plug-in direction. The curvature-limiting region limits the movement of the optical waveguide and/or the ferrule. Given the configuration of the curvature-limiting region, outward bending of the optical waveguide beyond a maximum permissible curvature is prevented.

13 Claims, 5 Drawing Sheets

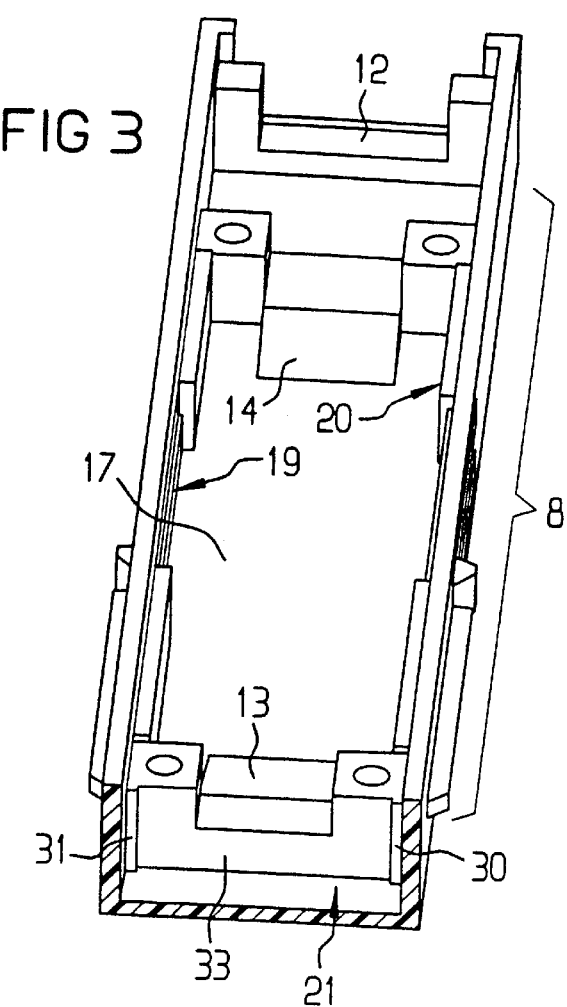
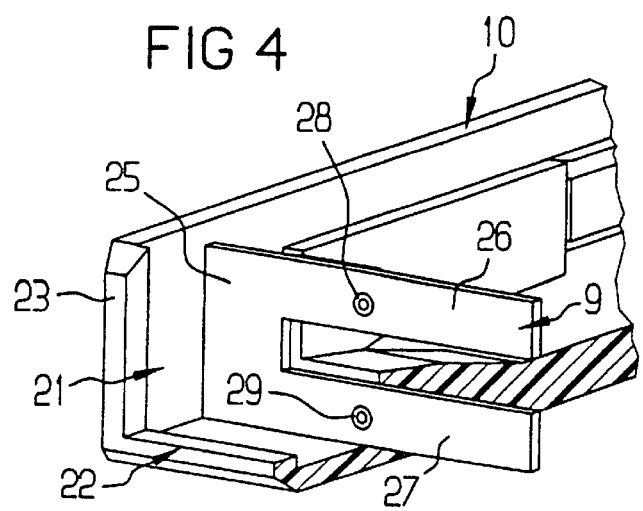

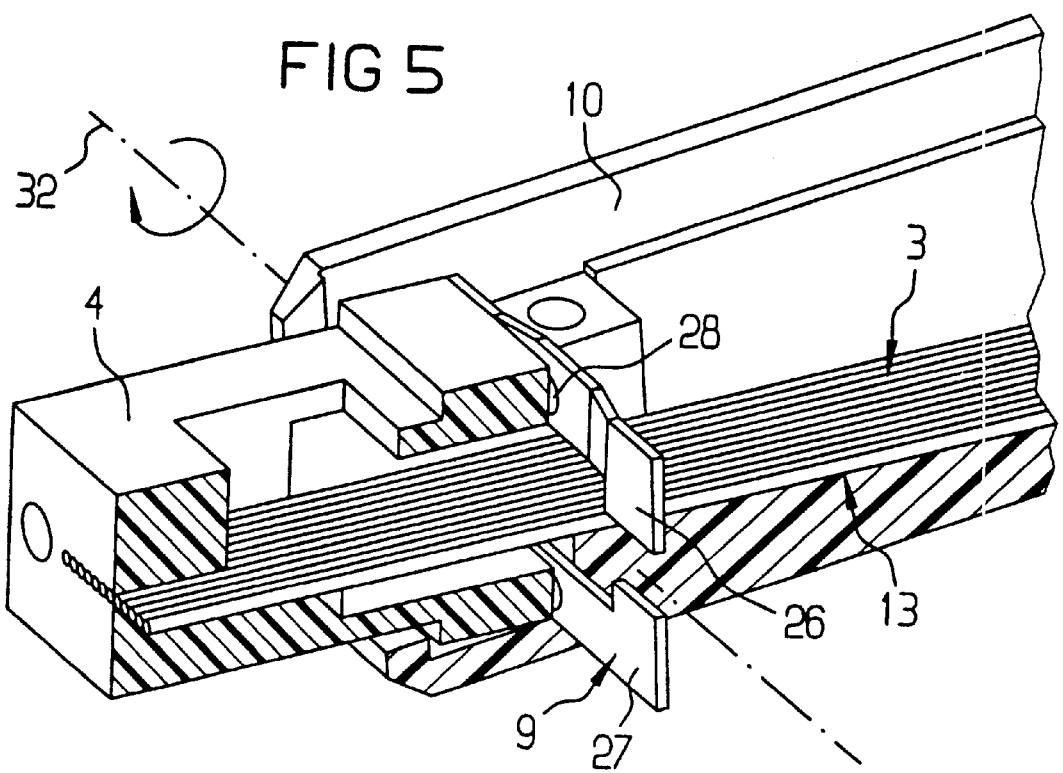
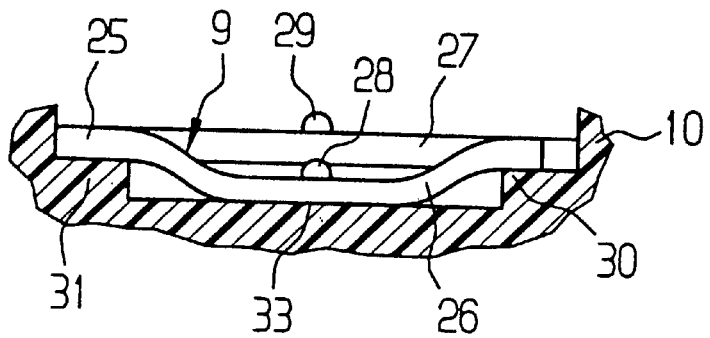

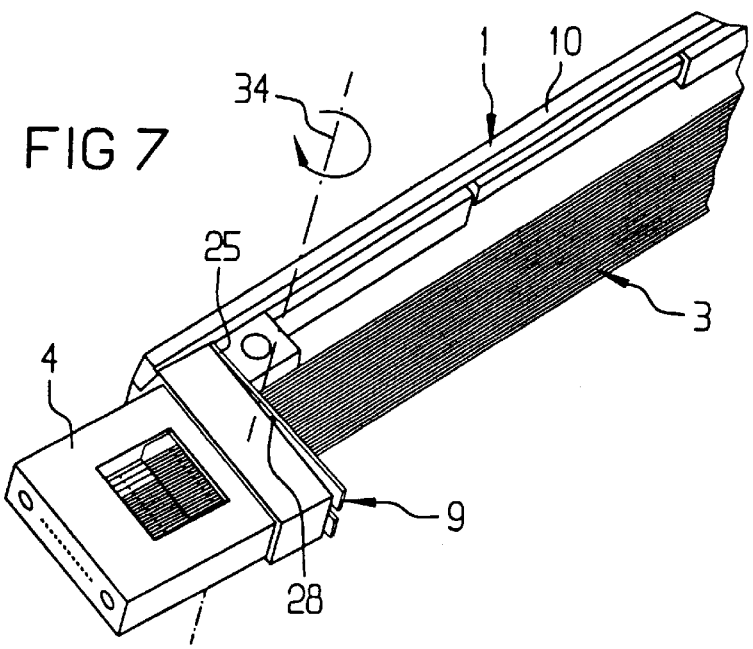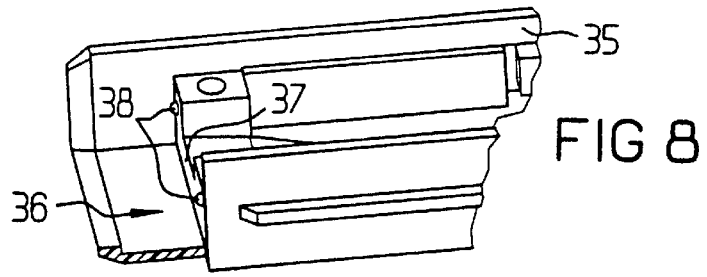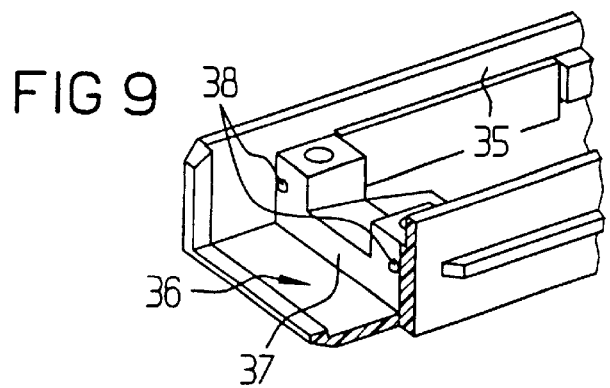

CONNECTOR FOR DETACHABLE CONNECTION OF AN OPTICAL WAVEGUIDE TO ANOTHER OPTICAL WAVEGUIDE

CROSS-REFERENCE TO RELATED APPLICATION

This is a continuation of copending International Application PCT/DE98/01478, filed May 29, 1998, which designated the United States.

BACKGROUND OF THE INVENTION

FIELD OF THE INVENTION

The invention lies in the field of optical connectors. The invention relates to a connector for detachable connection of a connector end region (through a ferrule) of an optical waveguide to another optical waveguide along a plug-in direction. The connector has a housing with a holding region for guiding the ferrule. The housing is configured such that the ferrule is guided and held in an angularly moveable way with respect to the plug-in direction. The housing also has a stress-relief region for firmly connecting the optical waveguide to the housing.

It is frequently necessary in the case of optical waveguides and, in particular, in the case of multiple optical waveguides, to connect an end region of an optical waveguide to another optical waveguide such that an optical signal can be transmitted from one optical waveguide to the next optical waveguide. For this purpose, end regions of the optical waveguides are typically held in ferrules, which, in the simplest case, grip an end of the optical waveguide to be connected and allow easy manipulation. For multiple optical waveguides that have a plurality of individual fibers, the individual fibers are held in a defined linear or matrix-shaped configuration within the ferrule so that, at a transition between two interconnected ferrules, a respective fiber of one multiple optical waveguide contacts a respective fiber of the other multiple optical waveguide. Connection of two optical waveguides creates an issue of impermissible stresses placed upon the optical fibers. Connectors have stress-relief elements in order to prevent over-stressing of an optical waveguide. The stress-relief elements of connectors are typically configured such that the optical waveguide is fixed within a housing so that forces applied to the optical waveguide are transmitted directly onto the housing without stressing the connection between the ferrule and optical waveguide.

If existing connectors are used not to make overhanging connections between optical waveguides but are, for example, used as terminals fastened on a printed circuit board, such connectors particularly lead to frequent mounting problems and/or problems in data transmission. For example, International PCT publication WO 86/02740 discloses a connector for optical waveguides. The connector has a pair of plug-in components, each holding a component having a pyramidal frustum shape. Ferrules, which are held rigidly close to one another and respectively hold the ends of the optical waveguides, are provided for connecting the optical waveguides.

European published, non-prosecuted patent application EP 0 602 726 A1 discloses a connector for optical waveguides. The connector allows the optical waveguides to be connected to a back plane. A captive ferrule, which holds the ends of the optical waveguides, is provided in order to connect the optical waveguides.

European published, non-prosecuted patent application EP 0 034 987 A1 discloses a connector for optical waveguides. In the connector, end regions of the two optical waveguides are gripped in a common flexible ferrule. The ferrule is then pressed between two sleeves to completely fill up a remaining cavity around the end regions of the two optical waveguides.

SUMMARY OF THE INVENTION:

It is accordingly an object of the invention to provide a connector for detachable connection of an optical waveguide to another optical waveguide that overcomes the hereinafore-mentioned disadvantages of the heretofore-known devices of this general type and that can be used for reliably and easily connecting optical conductor cables to printed circuit boards.

In accordance with the invention, a curvature-limiting region is provided, in the region between a stress-relief region and a holding region, for limiting the outward bending of the optical waveguide given an angular displacement of a ferrule with respect to a plug-in direction. The curvature-limiting region is provided both for individual fiber ferrules and for multiple fiber ferrules. The invention is based on the fundamental idea that large losses occur with optical waveguides when an optical waveguide is curved beyond a maximum permissible curvature. Existing prior art connectors readily permit the optical waveguide to be bent such that the maximum permissible curvature is exceeded because of ferrule displacement. As such, large transmission losses occur with these connectors. Given the configuration of the curvature-limiting region of the invention, outward bending of the optical waveguide beyond a maximum permissible curvature is prevented. Thereby ensuring a reliable transmission of data in all cases.

With the foregoing and other objects in view, there is provided, in accordance with the invention, a connector for the detachable connection of one end region of an optical waveguide to another end region of another optical waveguide in a plug-in direction, the connector, including a ferrule and a housing having a holding region for holding the ferrule and for moveably guiding the ferrule in an angular direction with respect to a plug-in direction, a stress-relief region for firmly connecting an optical waveguide to the housing, and at least one curvature-limiting region, disposed in a region on the housing between the stress-relief region and the holding region, for limiting the movement of at least one of a group consisting of the optical waveguide and the ferrule, the curvature-limiting region formed such that an outward bending of the optical waveguide is limited when the ferrule is angularly displaced with respect to the plug-in direction.

The curvature-limiting region may have at least one run-up wall that has a ramp-shaped cross section and is configured and disposed such that, given an angular displacement of the ferrule, the optical waveguide comes into contact at least partially in a linear fashion with at least one run-up wall. It is the linear contact between the optical waveguide and a run-up wall that ensures no occurrence of excessively high mechanical stressing on the optical waveguide given a limitation of the curvature of the optical waveguide. However, by the appropriate configuration of the run-up wall, it can be ensured that the optical waveguide assumes a predetermined maximum curvature over the entire length of the linear contact. Precisely in the case of multiple optical waveguides, a ramp of flat and bellied construction is desirable. Alternatively, a cone-shaped run-up wall can be provided for a round optical waveguide that can bend outward on all sides.

In accordance with another feature of the invention, the curvature-limiting region has at least one running wall with a ramp-shaped cross section and is configured such that an angular displacement of the ferrule causes the optical waveguide to come into contact at least partially in a linear fashion with the at least one running wall.

In the configuration of the invention, the holding region has a moveable bearing element carrying a stop end of the ferrule. The stop end for the ferrule is situated opposite that end face of the ferrule at which the optical waveguides emerge. The bearing element can be configured so at to be tiltable about an axis running transverse to the plugging direction of the connector. One way to provide the tilt is to provide bearing sites supporting the bearing element in the housing, the bearing sites preferably being configured as bearing edges or as bearing points projecting from the housing. Alternatively, the bearing element can have projecting bearing points.

In accordance with a further feature of the invention, the holding region includes a moveable bearing element having a stop end for the ferrule.

In accordance with an added feature of the invention, the bearing element is formed to be tilted about an axis disposed transverse to the plug-in direction.

In accordance with an additional feature of the invention, the housing includes bearing sites supporting the bearing element.

In accordance with yet another feature of the invention, the bearing sites are bearing edges.

In accordance with yet a further feature of the invention, the bearing sites are bearing points projecting from the housing.

In accordance with yet an added feature of the invention, the bearing element has projecting bearing points.

In a particular configuration, the bearing element is an elastically deformable plate. The bearing element can have a U-shape and be a metal component. Configuring the bearing element as an elastically deformable plate makes it possible to ensure, in a simple way, spatial displacement of the ferrule in all directions with respect to the plug-in direction. Accordingly, the deformable plate can be provided with bearing points about which the bearing element can be angularly tilted. Moreover, lateral edges of the bearing element can be set on bearing edges so that the plate can sag. It is, therefore, possible to provide a reliably operating connector in a simple way if stops are added to limit such sagging given large displacement forces.

In accordance with yet an additional feature of the invention, the bearing element is an elastically deformable plate.

In accordance with a concomitant feature of the invention, the bearing element is a U-shaped metal component.

Other features which are considered as characteristic for the invention are set forth in the appended claims.

Although the invention is illustrated and described herein as embodied in a connector for detachable connection of an optical waveguide to another optical waveguide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS:

FIG. 3 is a diagrammatic, sectional, perspective plan view of a subregion of the housing of FIG. 1, FIG. 4 is a diagrammatic, partially sectional, perspective, fragmentary view of a subregion of the housing of FIG. 1;

FIG. 5 is a diagrammatic, partially sectional, perspective, fragmentary view of a subregion of the connector of FIG. 1 containing a multiple optical waveguide in a stressed state;

FIG. 6 is a diagrammatic, sectional, fragmentary view of a bearing element of the connector of FIG. 5;

FIG. 7 is a diagrammatic, partially sectional, perspective, fragmentary view of the connector of FIG. 1 containing a multiple optical waveguide in a further stressed state;

FIG. 8 is a diagrammatic, partially sectional, perspective, fragmentary view of a subregion of a housing of a further connector according to the invention; and FIG. 9 is a diagrammatic, partially sectional, perspective, fragmentary view of a subregion of a housing according to FIG. 8.

DESCRIPTION OF THE PREFERRED EMBODIMENTS

Figure 1:
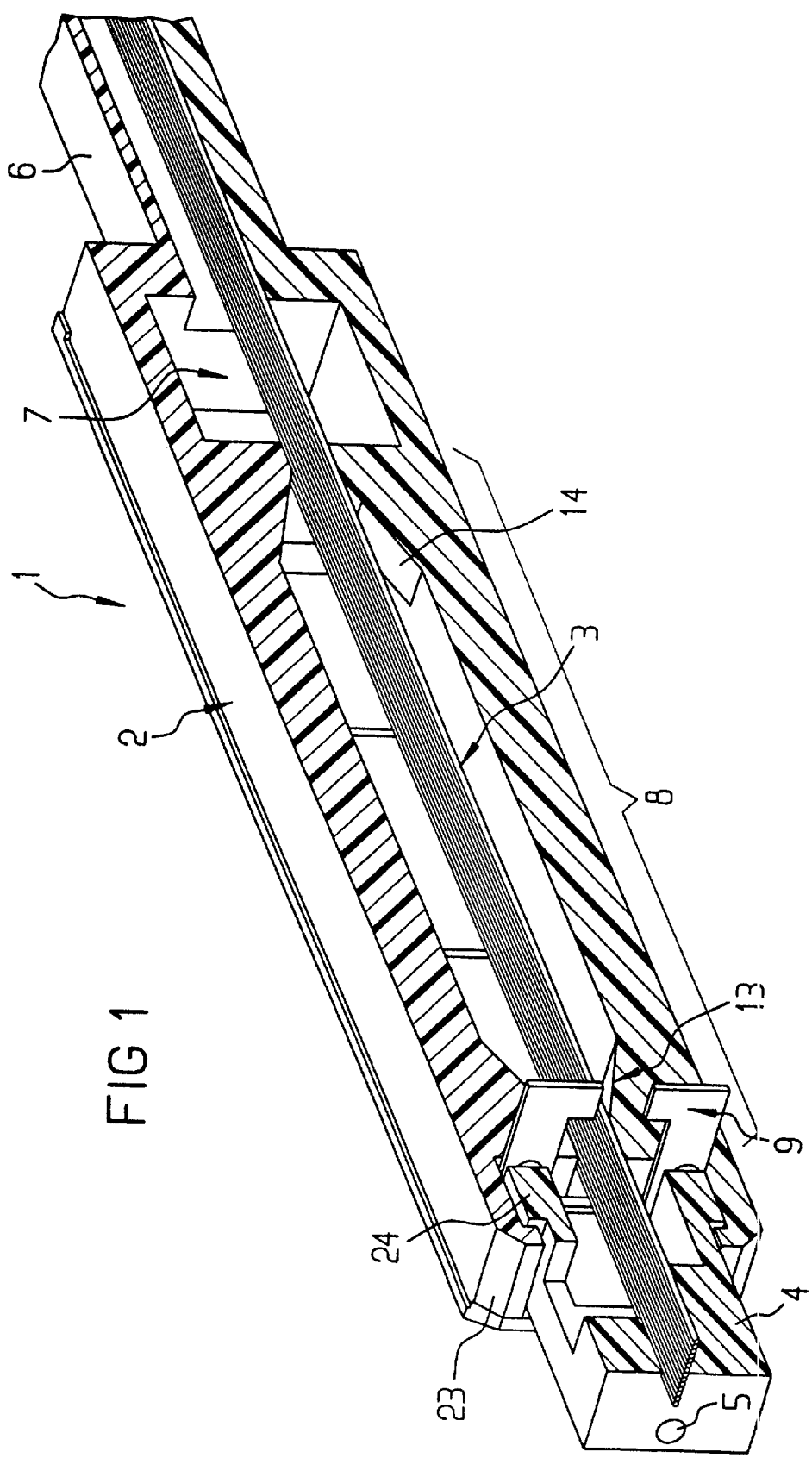
FIG. 1 is a diagrammatic, partially sectional perspective view of a connector according to the invention containing a multiple optical waveguide in an unstressed state.

In all the figures of the drawing, sub-features and integral parts that correspond to one another bear the same reference symbol in each case.

Referring now to the figures of the drawings in detail and first, particularly to FIG. 1 thereof, there is shown a perspective view of the connector 1 according to the invention. The connector 1 is represented in section along a longitudinal line of symmetry, thus affording a view into the interior of the connector 1. The housing 2 holds a flat multiple optical waveguide 3. The housing 2 has, at an output end, a ferrule 4. The ferrule 4 has cylindrical guide bores 5 for receiving non-illustrated guide pins.

On an end of the housing 2 opposite the ferrule 4, the housing 2 has an outlet sleeve 6 for the multiple optical waveguide 3. Adjoining the outlet sleeve 6 is a stress-relief region 7. Within the stress-relief region 7 the multiple optical waveguide 3 is firmly connected to the housing 2. A curvature-limiting region 8 is provided in the housing 2 in between the ferrule 4 and the stress-relief region 7. The ferrule 4 is supported on the curvature-limiting region 8 by a bearing element 9. The bearing element 9 ensures a spatial pivotability of the ferrule 4 with respect to the housing 2, and also ensures a limitation of the pivotability.

Figure 2:
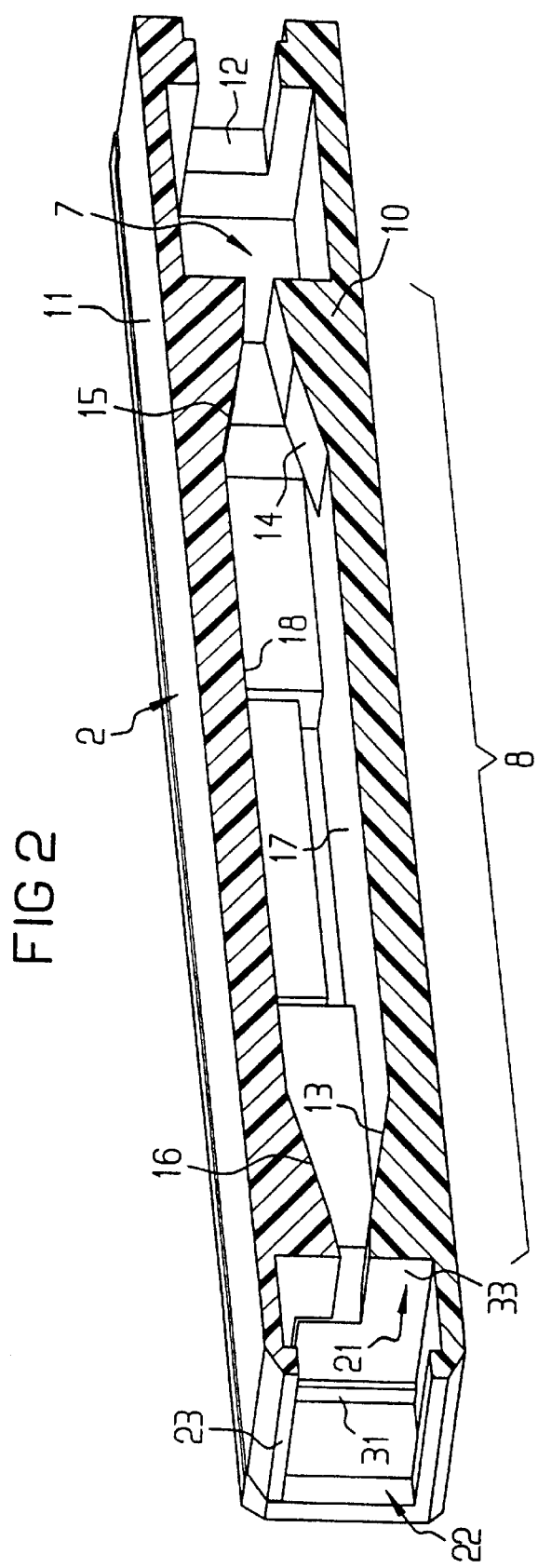
FIG. 2 is a diagrammatic, sectional perspective view of the optical waveguide housing of FIG. 1.

The housing 2 from FIG. 1 is shown in FIG. 2 without additional components of the connector 1 inserted therein. As may be seen particularly well in the FIG. 2 view, the housing 2 is subdivided into a housing trough 10 and a housing cover 11. The housing trough 10 is open at the top. The housing cover 11 is constructed such that it completely closes the top side of the housing trough 10. The housing trough 10 and the housing cover 11 form a sleeve opening 12 of rectangular cross section adjoining the stress-relief region 7 (in other words, on the right of FIG. 2 and the top of FIG. 3). The stress-relief region 7 has a cubic contour and is filled with retaining material in the mounted state of the connector 1.

The curvature-limiting region 8 can be seen particularly well in FIGS. 2 and 3. The curvature-limiting region 8 has two ramps 13, 14, 15 and 16 on both the top and bottom sides. The curvature-limiting region 8 runs parallel to the outer edges of the housing 2 in a floor region 17 between the ramps 13 and 14, and in a ceiling region 18 between the ramps 15 and 16. The curvature-limiting region 8 is limited on both sides by essentially straight side walls 19 and 20. A ferrule chamber 21 (that serves to hold the ferrule 4) adjoins the curvature-limiting region 8. At the end opposite the curvature-limiting region 8 (the output end), the ferrule chamber 21 has an outlet opening 22, which has an outlet collar 23 tapering forward, or away from, the curvature-limiting region 8. The outlet collar 23 cooperates with a shoulder 24 of the ferrule 4 and prevents the ferrule 4 from falling out of the ferrule chamber 21.

A subregion of the housing trough 10 with the ferrule chamber 21 is shown in FIG. 4 with the bearing element 9 inserted in the ferrule chamber 21. As may be seen particularly well in the FIG. 4 view, the bearing element 9 is constructed as a sheet-metal component having a U-shaped outline in the plan view. In the embodiment, the bearing element 9 is subdivided into a base 25 (at the left of FIG. 4) with a first wing 26 situated above the region of the base 25 and a second wing 27 situated below. The first wing 26 is provided in the middle with a first elevation 28 that is formed by pressing into the first wing 26. The second wing 27 is likewise provided with a second elevation 29. In the embodiment with the bearing element 9 inserted into the ferrule chamber 21, the bearing element 9 bears against a first shoulder 30 and a second shoulder 31, seen best in FIGS. 2 and 3. The base 25 is disposed on the second shoulder 31, while the two respective ends of the first and second wings 26, 27 bear against the first shoulder 30.

An angular displacement of the ferrule 4 within the housing 2 about an axis 32 is illustrated in FIG. 5. As may be seen particularly well in the FIG. 5 view, the multiple optical waveguide 3 is pressed downward (from the position shown in FIG. 1) until it bears against the ramp 13. The multiple optical waveguide 3 is likewise pressed downward against the ramp 14 but is not illustrated in FIG. 5. The backlash compensation required between the ferrule 4 and the ferrule chamber 21 is achieved by a deformation of the bearing element 9. For such compensation, the first wing 26 is pressed downward by the rear edge of the ferrule 4 (the edge closest to the curvature-limiting region 8), because the rear edge of the ferrule 4 acts on the first elevation 28. The second wing 27 remains essentially unchanged and straight.

A section of the ferrule chamber 21 with the deformed bearing element 9 from FIG. 5 is shown in FIG. 6 in cross section. As can be seen particularly well in the view, the second wing 27 remains essentially undeformed, while the first wing 26 is pressed downward (towards the curvature-limiting region 8) because of the action of the ferrule 4 on the first elevation 28. The first wing 26 is pressed until it bears against a floor piece 33 of the ferrule chamber 21. Contact with the floor piece 33 defines the maximum tilting angle of the ferrule 4 about the axis 32. The multiple optical waveguide 3 bearing against the ramps 13 and 14 likewise prevents the waveguide 3 from being curved by more than a maximum permissible curvature.

A perspective view of the connector 1 from FIG. 1 is shown in FIG. 7. Therein, the ferrule 4 is shown angularly displaced from its initial position (shown in FIG. 1) around an axis 34. The axis 34 is transverse to the axis 32. As seen particularly well in the view, the bearing element 9 is not deformed. Instead, because the first elevation 28 and the second elevation 29 form bearing points, the rear edge of the ferrule 4 is tilted about the first and second elevations 28, 29. The rotational path of the ferrule 4 about the axis 34 is limited by a lateral edge of the rear surface of the ferrule 4 bearing against the base 25 of the bearing element 9. The rotational limiting effectively prevents overshooting of a maximum permissible curvature of the multiple optical waveguide 3 about the axis 34.

Perspective views of a subregion of a further housing trough 35 with a ferrule chamber 36 according to the invention are shown in FIGS. 8 and 9. The ferrule chamber 36 corresponds essentially to the ferrule chamber 21 from FIGS. 1 to 7. However, in contrast with the ferrule chamber 21, the ferrule chamber 36 has no shoulders on a floor piece 37. In place of the shoulders are hemispherical elevations 38 about which a non-illustrated bearing element 9 can be pivotably constructed.

The connector according to the invention can be used to achieve permanent stress relief of the optical waveguide. As such, compression of the optical waveguide and overshooting of a maximum permissible curvature of the optical waveguide are avoided. Finally, the connector according to the invention can also be used to achieve a high packing density, opening up the possibility for a wide spectrum of different applications.

We claim:

1. A connector for the detachable connection of one end region of an optical waveguide to another end region of another optical waveguide in a plug-in direction, the connector, comprising:
    a ferrule; and
    a housing having:
        a holding region for holding said ferrule and for moveably guiding said ferrule in an angular direction with respect to a plug-in direction;
        a stress-relief region for firmly connecting an optical waveguide to said housing; and
        at least one curvature-limiting region, disposed in a region on the housing between said stress-relief region and said holding region, for limiting the movement of at least one of a group consisting of the optical waveguide and said ferrule, said curvature-limiting region formed such that an outward bending of the optical waveguide is limited when said ferrule is angularly displaced with respect to the plug-in direction.

2. The connector according to claim 1, wherein said curvature-limiting region has at least one running wall with a ramp-shaped cross section and is configured such that an angular displacement of said ferrule causes the optical waveguide to come into contact at least partially in a linear fashion with said at least one running wall.

3. The connector according to claim 1, wherein said holding region includes a moveable bearing element having a stop end for said ferrule.

4. The connector according to claim 3, wherein said bearing element is formed to be tilted about an axis disposed transverse to the plug-in direction.

5. The connector according to claim 4, wherein said housing includes bearing sites supporting said bearing element.

6. The connector according to claim 5, wherein said bearing sites are bearing edges.

7. The connector according to claim 6, wherein said bearing sites are bearing points projecting from said housing.

8. The connector according to claim 4, wherein said bearing element has projecting bearing points.

9. The connector according to claim 3, wherein said housing includes bearing sites supporting said bearing element.

10. The connector according to claim 9, wherein said bearing sites are bearing edges.

11. The connector according to claim 9, wherein said bearing sites are bearing points projecting from said housing.

12. The connector according to claim 3, wherein said bearing element is an elastically deformable plate.

13. The connector according to claim 3, wherein said bearing element is a U-shaped metal component.

* * * * *